(12) United States Patent
Beverly et al.

(10) Patent No.: US 8,687,487 B2
(45) Date of Patent: Apr. 1, 2014

(54) METHOD AND SYSTEM FOR COMMUNICATION BETWEEN NODES

(75) Inventors: Harlan T. Beverly, McDade, TX (US); Kumar Gala, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 12/053,427

(22) Filed: Mar. 21, 2008

(65) Prior Publication Data

US 2008/0239954 A1 Oct. 2, 2008

Related U.S. Application Data

(60) Provisional application No. 60/908,024, filed on Mar. 26, 2007.

(51) Int. Cl.
*H04J 1/16* (2006.01)
*H04J 3/14* (2006.01)

(52) U.S. Cl.
USPC .......................................... 370/231; 370/236

(58) Field of Classification Search
USPC .................. 370/236, 392; 709/200, 220, 223
See application file for complete search history.

(56) References Cited

U.S. PATENT DOCUMENTS

| | | | |
|---|---|---|---|
| 5,353,412 A | 10/1994 | Douglas et al. | |
| 5,355,371 A | 10/1994 | Auerbach et al. | |
| 5,675,736 A | 10/1997 | Brady et al. | |
| 5,771,287 A | 6/1998 | Gilley et al. | |
| 5,890,963 A | 4/1999 | Yen | |
| 6,009,458 A | 12/1999 | Hawkins et al. | |
| 6,015,348 A | 1/2000 | Lambright et al. | |
| 6,240,517 B1 | 5/2001 | Nishioka | |
| 6,424,621 B1* | 7/2002 | Ramaswamy et al. | ........ 370/230 |
| 6,615,218 B2 | 9/2003 | Mandal et al. | |
| 6,625,661 B1 | 9/2003 | Baldwin, Jr. et al. | |
| 6,745,236 B1 | 6/2004 | Hawkins et al. | |
| 6,763,371 B1 | 7/2004 | Jandel | |
| 6,810,528 B1 | 10/2004 | Chatani | |

(Continued)

FOREIGN PATENT DOCUMENTS

| | | |
|---|---|---|
| DE | 10218795 | 11/2003 |
| JP | 10314451 | 12/1998 |

(Continued)

OTHER PUBLICATIONS

PCT International Search Report, Jun. 25, 2008, 9 pages.

(Continued)

*Primary Examiner* — Abdullah Riyami
*Assistant Examiner* — Brian Cox
(74) *Attorney, Agent, or Firm* — DeLizio Gilliam, PLLC

(57) ABSTRACT

A method of communicating with a network interface includes providing a packet to the network interface, where the packet includes an address field indicating a destination of the packet. The network interface analyzes the address field, and determines if it reflects an address associated with the network interface. If not, the network interface provides the packet to a network. If the network interface determines the address field reflects an address associated with the interface, it provides information in the packet to an application executing at the network interface. Accordingly, information targeted to an application can be communicated by associating an address, such as a network address, with the network interface, allowing for communication of the information without extensive processing of each packet at the interface.

13 Claims, 4 Drawing Sheets

(56) References Cited

U.S. PATENT DOCUMENTS

| | | | |
|---|---|---|---|
| 6,908,389 B1 | 6/2005 | Puskala | |
| 6,918,042 B1 | 7/2005 | Debry | |
| 6,941,353 B1 | 9/2005 | Lane | |
| 6,961,852 B2 | 11/2005 | Craft | |
| 6,970,943 B1* | 11/2005 | Subramanian et al. | 709/238 |
| 6,988,196 B2 | 1/2006 | Cromer et al. | |
| 7,000,115 B2 | 2/2006 | Lewis et al. | |
| 7,003,548 B1 | 2/2006 | Barck et al. | |
| 7,046,680 B1 | 5/2006 | McDysan et al. | |
| 7,056,217 B1 | 6/2006 | Pelkey et al. | |
| 7,065,756 B2 | 6/2006 | Barsness et al. | |
| 7,139,780 B2 | 11/2006 | Lee et al. | |
| 7,209,449 B2 | 4/2007 | Tang et al. | |
| 7,249,109 B1 | 7/2007 | Silverbrook et al. | |
| 7,274,702 B2 | 9/2007 | Toutant et al. | |
| 2001/0014097 A1* | 8/2001 | Beck et al. | 370/401 |
| 2002/0078223 A1 | 6/2002 | Baldonado et al. | |
| 2002/0180583 A1 | 12/2002 | Paatero et al. | |
| 2002/0198932 A1 | 12/2002 | Wagner | |
| 2003/0041136 A1 | 2/2003 | Cheline et al. | |
| 2003/0177187 A1 | 9/2003 | Levine et al. | |
| 2003/0191857 A1 | 10/2003 | Terrell et al. | |
| 2003/0198017 A1 | 10/2003 | Hashimoto et al. | |
| 2003/0204566 A1 | 10/2003 | Dhupelia et al. | |
| 2004/0015725 A1 | 1/2004 | Boneh et al. | |
| 2004/0068580 A1 | 4/2004 | Jo et al. | |
| 2004/0230801 A1 | 11/2004 | Sueyoshi et al. | |
| 2004/0246905 A1 | 12/2004 | Dunagan et al. | |
| 2004/0249879 A1 | 12/2004 | Beverly | |
| 2004/0259633 A1 | 12/2004 | Gentles et al. | |
| 2005/0044270 A1 | 2/2005 | Grove et al. | |
| 2005/0060442 A1 | 3/2005 | Beverly et al. | |
| 2005/0107161 A1 | 5/2005 | Fujimoto et al. | |
| 2005/0188073 A1 | 8/2005 | Nakamichi et al. | |
| 2005/0278459 A1 | 12/2005 | Boucher et al. | |
| 2006/0010133 A1 | 1/2006 | Bozek et al. | |
| 2006/0010265 A1* | 1/2006 | Aiken et al. | 710/33 |
| 2006/0034275 A1* | 2/2006 | Roberts et al. | 370/389 |
| 2006/0069724 A1 | 3/2006 | Langdon | |
| 2006/0098653 A1 | 5/2006 | Adams et al. | |
| 2006/0121986 A1 | 6/2006 | Pelkey et al. | |
| 2006/0160621 A1 | 7/2006 | Rowe et al. | |
| 2006/0203842 A1 | 9/2006 | Wollmershauser et al. | |
| 2006/0259579 A1 | 11/2006 | Beverly | |
| 2006/0259632 A1 | 11/2006 | Crawford et al. | |
| 2006/0274750 A1* | 12/2006 | Babbar et al. | 370/390 |
| 2007/0005986 A1 | 1/2007 | Bernard et al. | |
| 2007/0060373 A1 | 3/2007 | Beverly | |
| 2007/0086343 A1 | 4/2007 | Kujawa et al. | |
| 2007/0101408 A1 | 5/2007 | Nakhjiri | |
| 2007/0189517 A1 | 8/2007 | Koseki et al. | |
| 2007/0226498 A1 | 9/2007 | Walmsley et al. | |
| 2007/0297405 A1 | 12/2007 | He | |
| 2007/0298879 A1 | 12/2007 | Kobayashi et al. | |
| 2008/0005441 A1* | 1/2008 | Droux et al. | 710/306 |
| 2008/0009337 A1 | 1/2008 | Jackson et al. | |
| 2008/0009352 A1 | 1/2008 | Aoyama et al. | |
| 2008/0010371 A1 | 1/2008 | Yamamoto et al. | |
| 2008/0013551 A1 | 1/2008 | Scholl | |
| 2008/0016236 A1 | 1/2008 | Beverly et al. | |
| 2008/0022389 A1 | 1/2008 | Calcev et al. | |
| 2008/0039208 A1 | 2/2008 | Abrink et al. | |
| 2008/0045285 A1 | 2/2008 | Fujito | |
| 2008/0049621 A1 | 2/2008 | McGuire et al. | |

FOREIGN PATENT DOCUMENTS

| | | |
|---|---|---|
| JP | 2001246147 | 9/2001 |
| WO | 03062995 A2 | 7/2003 |
| WO | 2006124357 A2 | 11/2006 |

OTHER PUBLICATIONS

International Search Report for PCT/US06/017659 dated Jul. 10, 2007, 3 pages.

Bangun, Ricky A. et al., "A Network Architecture for Multiuser Networked Games on Demand," 1997 International Conference on Information, IEEE, vol. 3, pp. 1815-1819, XP002507873.

Smed, Jouni et al., "Aspects of Networking in Multiplayer Computer Games," Electronic Library Emerald UK, vol. 20, No. 2, 2002, pp. 87-97, XP002507872.

CyberGuard: "CyberGuard SG User Manual," retrieved from kc.mcafee.com/resources/sites/MCAFEE/content/live/product_documentation/21000/PD21320/en_US/UserManual_v2.1.0.pdf, Aug. 23, 2004, pp. 1-202.

EP Search Report for 08732696.3 dated Mar. 30, 2011, 8 pages.

"European Application No. 08732696 EPO Examination Report", Dec. 14, 2011, 7 pages.

"Data Race Announces Winmax 'Soft' Modem, Fax, LAN Combo PC Card Sold Directly to Consumers", PR Newswire, http://www.thefreelibrary.com/data+race+announces+Winmax+'Soft'+. . . , downloaded from web on Sep. 16, 2013. Mar. 7, 1995, 3 pages.

* cited by examiner

METHOD AND SYSTEM FOR COMMUNICATION BETWEEN NODES

CROSS REFERENCE TO RELATED APPLICATIONS

This application claims priority to U.S. Provisional Patent Application No. 60/908,024, entitled "METHOD AND SYSTEM FOR ABSTRACT PRIVATE COMMUNICATION BETWEEN TWO NODES," filed on Mar. 26, 2007, which is assigned to the current assignee hereof and is incorporated herein by reference in its entirety.

FIELD OF THE DISCLOSURE

The present disclosure relates to communication of information between data processing devices.

BACKGROUND

For some data processing devices, it can be useful to perform data processing tasks at more than one processing module. This provides for more efficient execution of processing tasks, improving the device speed and increasing the number and type of tasks that can be executed by the device. For data processing devices that employ more than one processing module, it can be desirable to have the processing modules communicate with each other. This allows a particular task to be executed by a combination of both processing modules. However, providing communications format between processing modules can be difficult, as existing communication protocols do not allow a processing module to readily differentiate between communications intended for processing and communications intended for another purpose. Accordingly, an improved method and system for communication between devices would be useful.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

A method of communicating with a network interface includes providing a packet to the network interface, where the packet includes an address field indicating a destination of the packet. The network interface analyzes the address field, and determines if it reflects an address associated with the network interface. If not, the network interface provides the packet to a network. If the network interface determines the address field reflects an address associated with the interface, it provides information in the packet to an application executing at the network interface. Accordingly, information targeted to an application can be communicated by associating an address, such as a network address, with the network interface, allowing for communication of the information without extensive processing of each packet at the interface.

Figure 1:
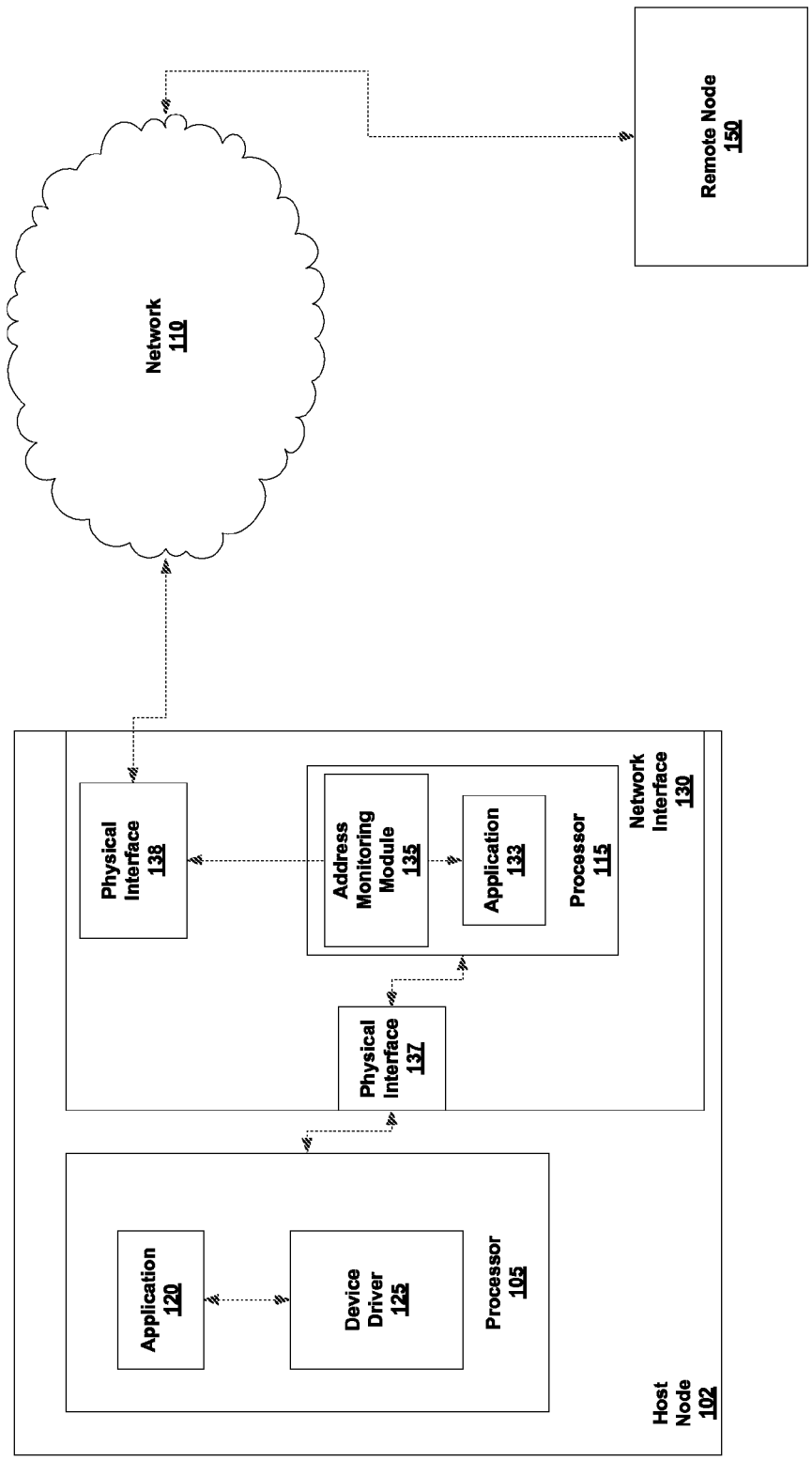
FIG. 1 is a block diagram of a data processing system in accordance with one embodiment of the present disclosure.

Referring to FIG. 1, a block diagram of a particular embodiment of a data processing system 100 is illustrated. The data processing system includes a host node 102, a remote node 150, and a network 110. As used herein, a node refers to a data processing device that is configured to receive or send information to another node. Thus, each of the host node 102 and remote node 150 can be data processing devices such as a computer. Both the host node 102 and the remote node 150 are connected to the network 110.

The network 110 is a packet switched network configured to communicate packets to nodes in the network. Each packet communicated by the network 110 includes address information indicating the target node for that packet. Accordingly, each node associated with the network 110, including the host node 102 and the remote node 150, is associated with a unique address, such as an Internet Protocol (IP) address, a Media Access Control (MAC) address, and the like. The network 110 includes one or more routers, servers, and other routing devices that route a packet through the network based on the target address information indicated by the packet. The network 110 can be a wide-area network, such as the Internet, or a local area network, or a combination thereof.

The host node 102 includes a processor 105 and a network interface 130. The processor 105 is a data processing device configured to execute applications, including an application 120 and a device driver 125. The application 102 is an application configured to communicate with the network interface 130 and the remote node 150. In particular, the application 102 is configured to provide information for communication to either the network interface 130 or the remote node 150 via the device driver 125. In a particular embodiment, the network interface 130 and the processor 105 are enclosed within a common physical housing, such as a single computer device (e.g. a desktop computer, laptop computer, server, or the like).

The device driver 125 is configured to control the network interface 130, and in particular to provide an interface between the application 120 and the network interface 130. Accordingly, in response to receiving information from the application 120, the device driver 125 forms the information into one or more packets and provide those packets to the network interface 130.

The network interface 130 is configured to communicate packets to the network 110. In particular the network interface 130 also includes a physical interface 137, which provides a physical medium of communication between the processor 105 and the processor 115. The physical interface can be a bus interface, a network interface, and the like. The network interface 130 also includes a physical interface 138, which provides a physical medium of communication between the host node 102 and the network 110. The physical interface 138 controls physical signaling to the network 110 to ensure that packets are provided to the network. In addition, the network interface 130 includes a processor 115 configured to execute applications, such as the application 133. The application 133 can be any kind of software application or function, such as a web server, portion of an online interactive game (e.g. a game server), and the like. Thus, both the processor 105 and the processor 115 are configured to execute applications, allowing the host node 102 to perform tasks more efficiently. In addition, the network interface 130 is configured to execute applications and to interface with the network 110, providing for additional processing ability without requiring an additional motherboard or other space-consuming device to provide the processing ability.

In operation, the host node 102 associates the network interface 130 with a network address. In an embodiment, this network address is different from the network address associated with the host node 102 itself. By associating the network interface 130 with a network address, such as an IP or MAC address, the application 130 is able to easily communicate with either the application 133 and the remote node 150 without a large amount of additional processing overhead.

To illustrate, in order to provide information to the remote node 150, the application 120 sends the information to the device driver 125, which forms a packet including address information associated with the remote node 150 and communicates the packet to the physical interface 137 at the network interface 130, which in turn provides the received packet to an address monitoring module 135. The address monitoring module 135 at the network interface 130 analyzes the packet and determines that the address information reflected in the packet indicates the packet is not targeted for any applications running at the network interface 130. Accordingly, the address monitoring module 135 provides the packet to the physical interface 138, which communicates the packet to the network 110. The network 110 in turn routes the packet to the remote node 150.

In order to provide information to the application 133, the application 120 sends the information to the device driver 125, which forms a packet including the information in a data payload, and also including address information associated with the network interface 130. The device driver 125 provides the packet to the network interface 130, and the address monitoring module 135 determines that the address information reflected in the packet is associated with an application running at the network interface 130. Accordingly, the address monitoring module 135 provides the packet to the application 133, which accesses the information included in the data payload of the packet. Thus, by associating a network address with the network interface 130, the application 120 can send information to the application 133 through an existing device driver 125, without extensive redesign of the driver or the application itself.

The application 133 can also communicate information to the application 120 by forming packets addressed to the network address associated with the host node 102. The packets are looped back to the processor 105 by the network interface 130. In particular, the processor 115 determines the packets are addressed to the host node 102, and in response provides the packets to the physical interface 137, which provides the packets to the device driver 125, which in turn provides the information reflected in the packets to the application 120. Thus, the application 133 can Network addresses are typically assigned via a network administrator or network administration software such as a DHCP server. The host node 102 will acquire or be configured with its network address by the network administrator or the network administration software. This associates the host node 102 with the assigned network address for subsequent communication of packets.

The network address associated with the network interface 130 can be determined by one of a number of different methods. First, the address can be assigned by a network administrator or administration software such as a DHCP server in the same way as an address was assigned to the host node 102. In this case, the network address would appear to be similar to any other network address on the external network. In some cases this method may not be desirable because it might expose applications running inside the network interface to other nodes on the external network opening a potential security hole.

A second method would be to assign a network address that is not addressable or routable on the external network to provide for added security that only the host node can access applications running in the network device. This can be accomplished by using a special command from the device driver 125 to the network interface 130 to indicate what the assigned address should be. Alternatively, the network interface 130 itself could determine an appropriate non-routable network address once the host node has been assigned its own network address.

The operation of the data processing system 100 can be understood with reference to an example. In the example, the application 133 is a web server that provides information to the network 110 indicative of a web page. The application 120 can be a database or other application that produces content for the web pages provided by the application 133. The remote node 150 can be another server that produces web pages reflecting information from the application 120. By providing information to the network interface 130 and the remote node 150 in the manner described above, the application 120 can efficiently update the web pages provided by both the application 133 and the remote node 150 using the device driver 125.

The host node 120 can also associate a particular alphanumeric string, referred to as a name, with the address assigned to the network interface 130. This can allow a user to easily access and communicate with the network interface 130. For example, in an embodiment the application 120 can be a web interface application, such as a web browser. By entering the name associated with the address assigned to the network interface into an address bar of the web interface, a user can ensure that information entered via the application 120 is provided to the network interface 130.

In an embodiment, the address assigned to the network interface 130 is associated with a private address space. As used herein, private address space refers to a set of network addresses that are generally accessible via a wide area network such as the Internet. By assigning the network interface 130 a private address, this ensures that the assigned address does not match the network address of another node in the network 110, such as the remote node 150. This in turn ensures that the address assigned to the network interface is unique with respect to other nodes in the network and non-routable.

Figure 2:
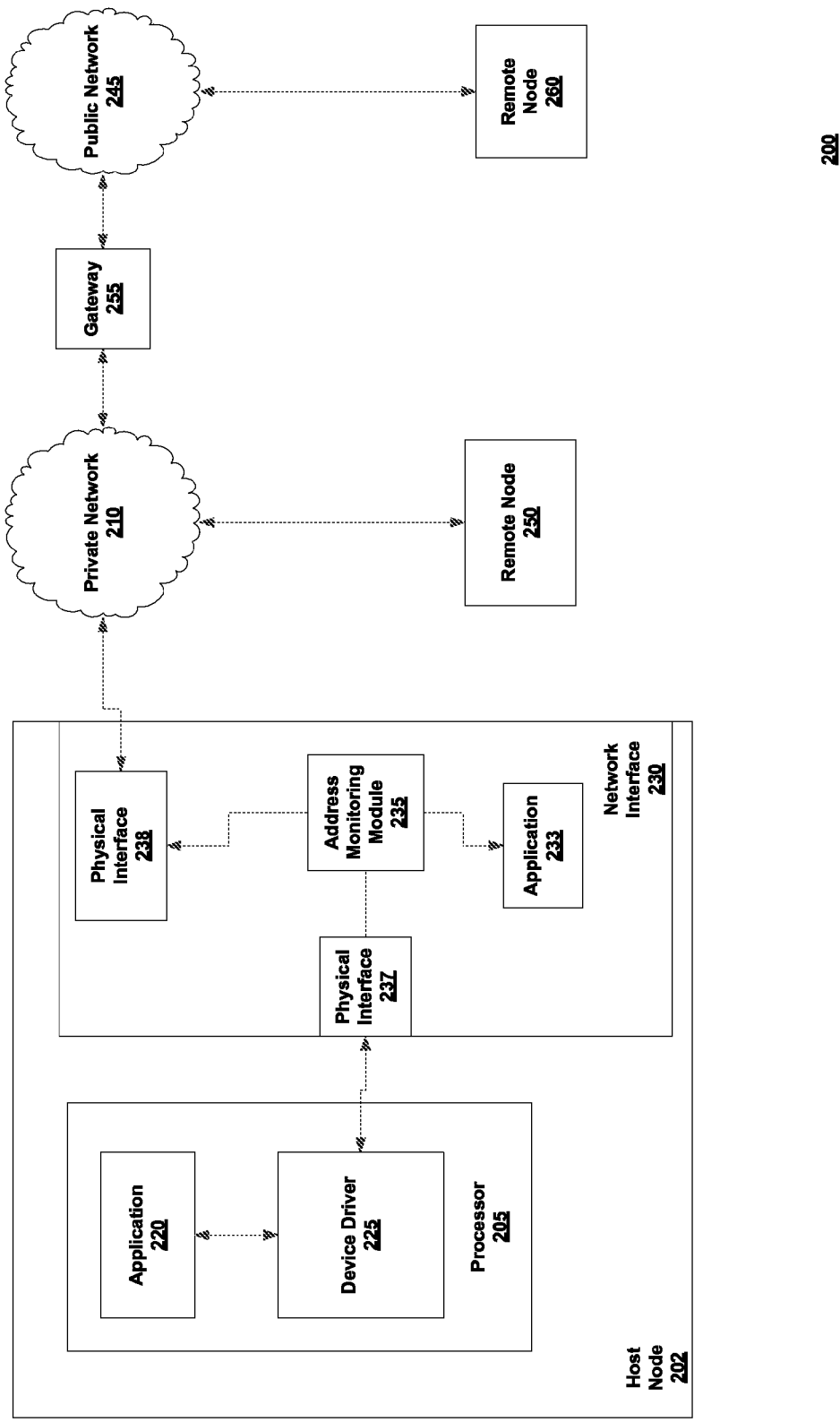
FIG. 2 is a block diagram of a data processing system in accordance with another embodiment of the present disclosure.

Referring to FIG. 2, a block diagram of a particular embodiment of a data processing system 200 is illustrated, including a host node 202, a remote node 250, a remote node 260, a private network 210, and a public network 245. The host node 202 and remote node 250 are connected to the private network 210, while the remote node 260 is connected to the public network 245. In addition, the private network 210 is connected to a gateway 255, which is also connected to the public network 245.

The public network 245 is a packet switched network including a number of routers, servers, clients, and other computer devices configured to route packets through the network. Each device in the public network can be associated with a unique address, such as an IP address. The public network 245 is associated with a public address space, whereby each device in the network can communicate with each other device. Further, the addresses of the public address space are also known to devices in the private network 210.

The private network 210 is a packet switched network such as a local area network (LAN) or other network associated with a private address space relative to the public network 245. Thus, the private network 210 can include routers, servers, clients, or other computer devices, whereby each device is associated with a unique address. These addresses are private and non-routable with respect to the public network 245. For example, if a device in the public network 245 (e.g. a router) receives a packet associated with an address in the private address space of the private network 210, the device is typically configured to discard the packet, and typically cannot route the packet associated with the private address through the public network 245. This provides security for devices in the private network 210 by ensuring that the devices cannot be communicated with directly by devices in the public network 245.

The gateway 255 is a router, server, modem, digital subscriber line (DSL) device, or the like that is configured to provide for communication between the private network 210 and the public network 245. In particular, the gateway 255 is associated with both a public address of the public network 245 and a private address associated with the private network 210. To illustrate, the public network 245 can communicate packets to a device in the private network 210 by addressing the packet to the public address associated with the gateway 255. The gateway 255 determines the private address for the device that is the target of the packet, associates that private address with the packet, and provides the packet to the private network 210 for routing to the target device. Similarly, if a device in the private network 210 communicates a packet associated with a public address, the private network 210 routes the packet to the gateway 255, which in turn provides the packet to the public network 245 for routing to the destination.

The host node 202 is configured similarly to the host node 102 of FIG. 1, and accordingly includes a processor 205 and a network interface 230. The processor 205 is a data processing device configured to execute applications, including an application 220 and a device driver 225. The network interface 230 includes a physical interface 238, an address monitoring module 235, and an application 233. Each of these items is configured similarly to the corresponding item in FIG. 1. Accordingly, the network interface 230 can be associated with a network address, whereby the processor 205 can communicate with the network interface 230 via packets having the associated network address. Such packets are communicated to the application 233 by the address monitoring module 235. For packets with a different network address, the network interface 230 is configured to provide those packets to the private network 210 via the physical interface 238.

In the illustrated embodiment of FIG. 2, the network interface 230 is associated with a private network address. In addition, in order to avoid a potential conflict with a device in the private network 210, such as the remote node 250, the private network address associated with the network interface 230 is associated with a different private address space than the private address space associated with the private network 210. In this embodiment, the private address space associated with the network interface 230 is non-routable address space with respect to both the public network 245 and the private network 210. That is, a packet associated with the private address space of the network interface 230 will not be routed by either the private network 210 or the public network 245, but instead will be discarded. This provides a layer of security by ensuring that devices in either the private network 210 or the public network 245 can communicate directly with the network interface 230 and the application 233, even if the address associated with the network interface 230 is known.

To illustrate, in a particular embodiment the private network 210 is associated with a private address space based on a specified address subnet. For example, the address space of the private network 210 can be associated with the subnet 192.x.x.x, so that the address of each device in the private network 210 is an address in the 192 subnet. In this embodiment, the address associated with the network interface 230 will be from a different subnet, such as 10.x.x.x. This ensures that the private network address associated with the network interface 230 does not conflict with a private network address of a device in the private network 210. Further, the addresses associated with the subnet of the address for the network interface 230 are non-routable by the private network 210 and the public network 245, thereby shielding the network interface 230 from direct access by outside devices in either network. In another embodiment, the host node 202 can be associated with a public address, so that it can be communicated with directly by devices in the public network 245, such as the remote node 260, while the network interface 230 is associated with a private address that is not routable by either the private network 210 or the public network 245.

Figure 3:
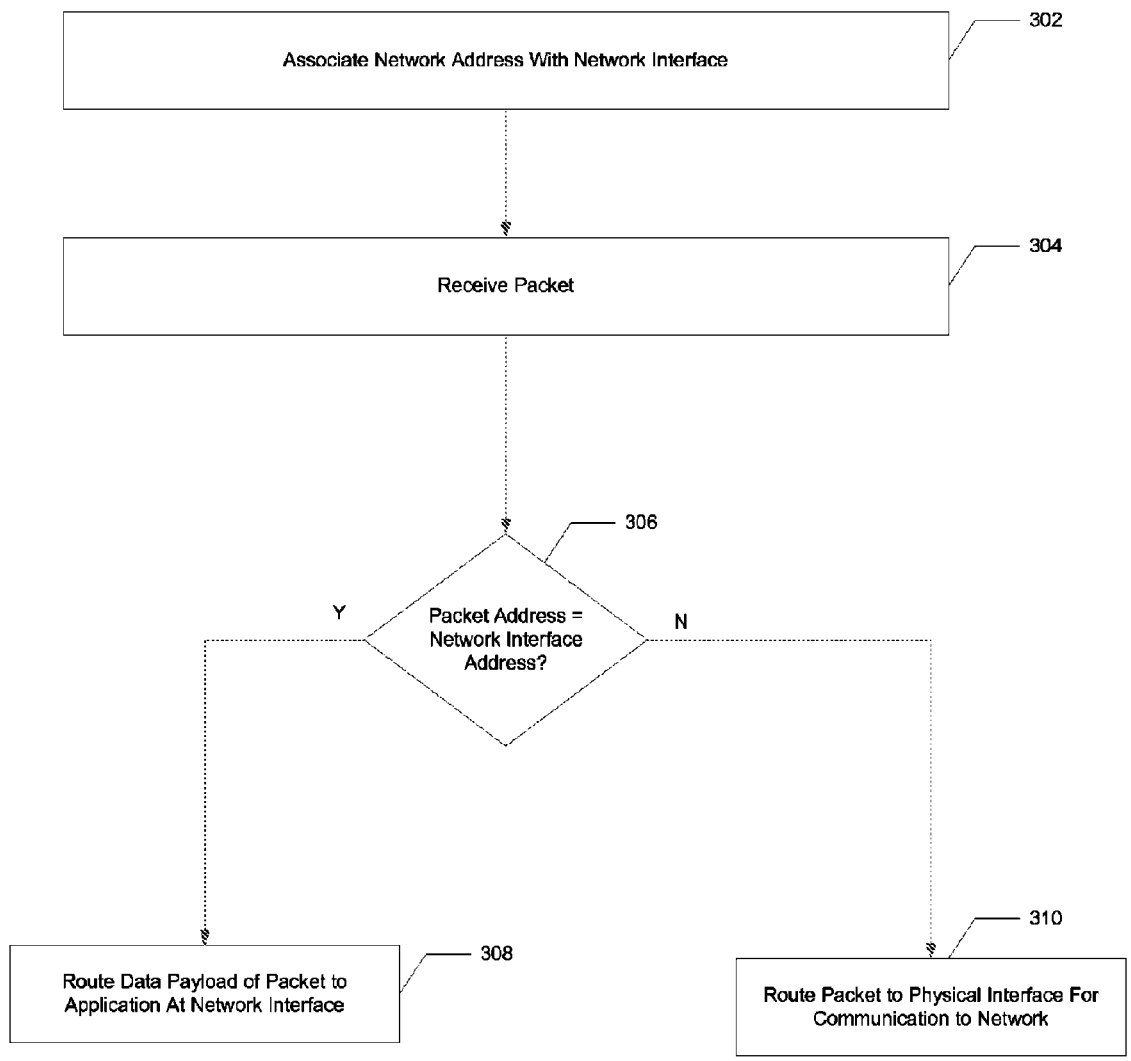
FIG. 3 is a flow diagram of a method of receiving a packet at a network interface device in accordance with one embodiment of the present disclosure.

Referring to FIG. 3, a flow diagram of a particular embodiment of a method of receiving a packet at a network interface device is illustrated. The network interface device can be a network interface card or other device configured to communicate with a network. At block 302, a network address is associated with the network interface. In an embodiment, the address associated with the network interface is a private network address. At block 304, a packet is received at the network interface. The packet includes address information indicating a target of the information included in a data payload of the packet. The target can be the network device itself, or another device that can receive communications via the network.

At block 306, it is determined whether the address information included in the packet indicates the network address of the network interface, or another address. If the address information indicates the network address of the network interface, the method flow moves to block 308 and the information in the data payload of the packet is routed to an application executing at the network interface device, such as a web browser, server application, online interactive game, and the like. If, at block 306, it is determined that the address information included in the packet is not associated with the network address of the network interface, the packet is routed to a physical interface of the network interface device. The physical interface communicates the packet to the network, where the packet is routed to the information target.

Figure 4:
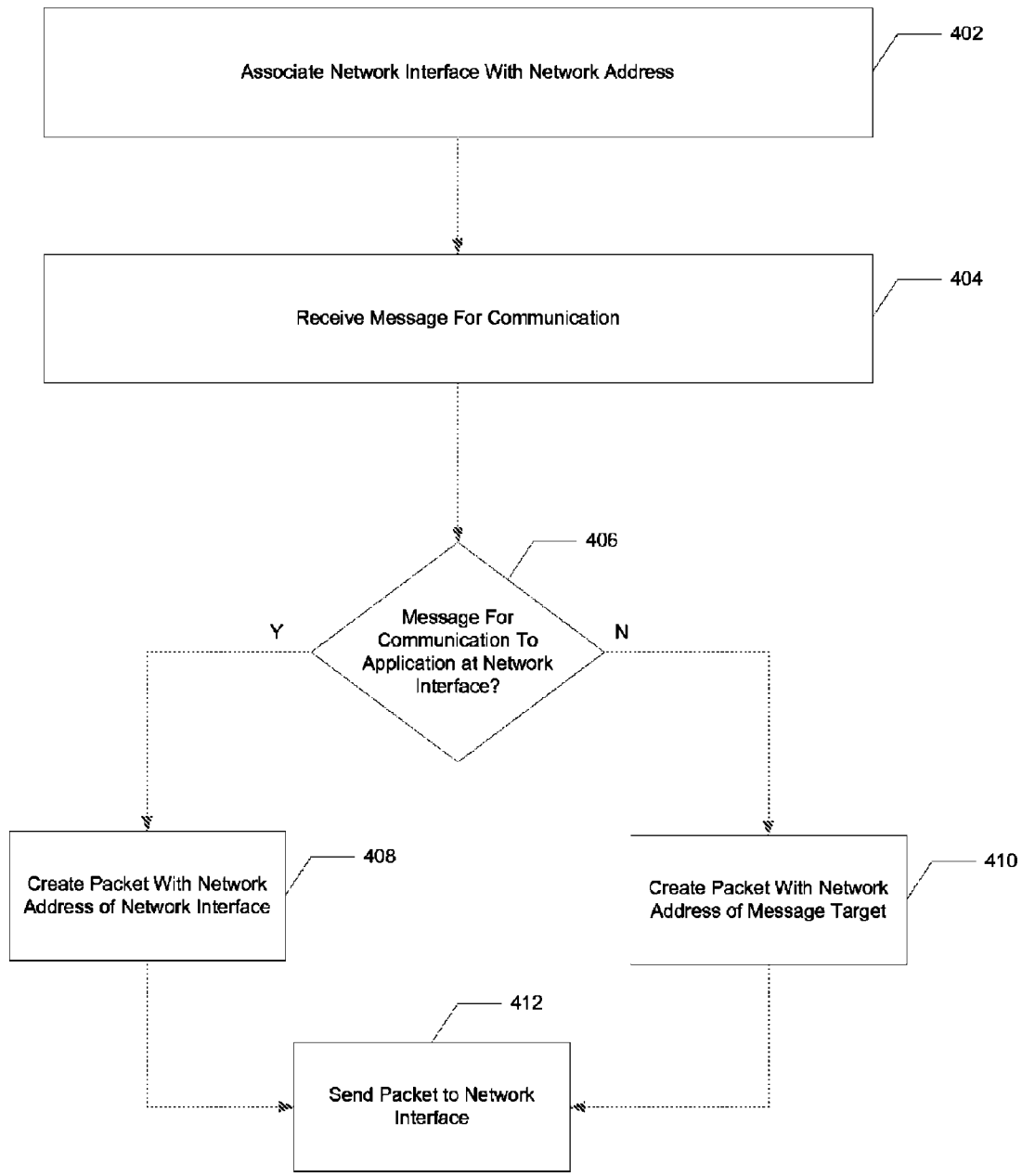
FIG. 4 is a flow diagram of creating a packet in accordance with one embodiment of the present disclosure.

Referring to FIG. 4, a flow diagram of a particular embodiment of a method of creating a packet is illustrated. At block 402, a network address is associated with a network interface device. At block 404, a message is received from an application at a device driver or other module configured to provide an interface between the application and the network interface device. The message indicates a target of the message. The target can be an application executing at the network interface device, or another device that can be communicated with via a network.

At block 406, the device driver or other interface module determines if the message is targeted to the application at the network interface device. If so, the method flow moves to block 408 and a packet is created. The packet includes information reflecting the message in a data payload of the packet. In addition, the packet includes a header or other portion that includes address information indicating the network address associated with the network interface device. At block 412, the created packet is provided to the network interface.

If, at block 406, it is determined that the message is not targeted to an application executing at the network interface, the method flow moves to block 410 and the device driver or other interface module creates a packet including a data payload and address portion, such as a header. The data payload includes information reflecting the message. The address portion includes information indicating an address associated with the device that is the target of the message. The method flow proceeds to block 412, and the packet is provided to the network interface for communication to the target device via the network.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a first packet at a network interface card coupled to a first processor via a bus, the network interface card associated with a first network address and the first processor associated with a second network address different from the first network address, the network interface card providing a physical layer interface to a network for the first processor;
   in response to determining that an address portion of the first packet received at the network interface card includes the first network address, providing a data payload of the first packet to a first application executing at the network interface card, the data payload not provided to the first processor based on the first network address, wherein the first application processes the data payload;
   receiving a second packet at the network interface card; and
   in response to determining that an address portion of the second packet received at the network interface card includes the second network address, providing, from the network interface card to the first processor via the bus, a data payload of the second packet from the network interface card to a second application executing at the first processor;
   wherein the first network address is a non-routable address with respect to the network and wherein the second network address is a routable address with respect to the network.

2. The method of claim 1, wherein the network interface card and the first processor are enclosed within a common physical housing.

3. The method of claim 1, wherein the first network address is selected from the group consisting of an Internet Protocol address and a Media Access Control (MAC) address.

4. The method of claim 1, wherein the first network address is associated with a first private network address space.

5. The method of claim 4, wherein the second network address is associated with a second private network address space.

6. The method of claim 1, further comprising:
   receiving a third packet at the network interface card from the first processor via the bus;
   in response to determining that an address portion of the third packet received at the network interface card includes the first network address, providing a data payload of the third packet to an application executing at the network interface card; and
   in response to determining that the address portion of the third packet received at the network interface card includes a third network address different from the first network address, providing the third packet to the network.

7. The method of claim 1, wherein said receiving the first packet at the network interface card comprises receiving the first packet at the network interface card via the bus from a device driver executing at the first processor, and said receiving the second packet at the network interface card comprises receiving the second packet at the network interface card from the first application executing at the network interface card.

8. A network interface card, comprising:
   a first physical interface operable to communicate packets to a network;
   a second physical interface operable to communicate packets with a host processor via a bus; and
   a first processor coupled to the first physical interface and the second physical interface, the first processor operable to:
   execute a first application;
   receive a first packet from the network via the first physical interface;
   in response to determining an address portion of the first packet received at the network interface card includes a first network address associated with the network interface card, provide a data payload of the first packet to the first application for processing by the first application and not provide the data payload to a second application executing at the host processor; and
   in response to determining the address portion of the first packet received at the network interface card includes a second network address not associated with the network interface card, provide the first packet via the second physical interface to the second application;
   wherein the first network address is a non-routable address with respect to the network and wherein the second network address is a routable address with respect to the network.

9. The network interface card of claim 8, wherein the network address associated with the network interface card is associated with a private network address space.

10. The network interface card of claim 8, wherein the first processor is further configured to:
    receive a second packet from the first application; and
    in response to determining the second packet includes address information associated with the host processor, provide the second packet to the second application.

11. The network interface card of claim 8, wherein the network interface card is incorporated in a physical housing with a host node.

12. The network interface card of claim 8, wherein the first processor is further operable to:
    receive a second packet from the host processor via the second physical interface;
    in response to determining an address portion of the second packet received at the network interface card includes the first network address associated with the network interface card, provide a data payload of the second packet to the first application; and
    in response to determining the address portion of the second packet received at the network interface card includes a third network address not associated with the network interface card, provide the second packet to the network via the first physical interface.

13. A network interface card, comprising:
a first physical interface operable to communicate packets to a network;
a second physical interface operable to communicate packets with a host processor via a bus; and
a first processor coupled with the first physical interface and the second physical interface, the first processor operable to:
execute a first application;
receive a first packet from the host processor via the second physical interface;
in response to determining the first packet received at the network interface card includes a first network address associated with the network interface card, provide a data payload of the first packet to the first application; and
in response to determining the first packet received at the network interface card includes a second network address not associated with the network interface card, provide the first packet to the network via the first physical interface;
wherein the first network address is a non-routable address with respect to the network and wherein the second network address is a routable address with respect to the network.

* * * * *